(12) United States Patent
Wilson

(10) Patent No.: US 7,004,700 B2
(45) Date of Patent: Feb. 28, 2006

(54) THEFT DETERRENT WHEEL FASTENER CAP ASSEMBLY AND METHOD

(75) Inventor: Larry J. Wilson, Commerce Township, MI (US)

(73) Assignee: MacLean-Fogg Company, Mundelein, IL (US)

( * ) Notice: Subject to any disclaimer, the term of this patent is extended or adjusted under 35 U.S.C. 154(b) by 0 days.

(21) Appl. No.: 10/423,276

(22) Filed: Apr. 25, 2003

(65) Prior Publication Data

US 2003/0202860 A1 Oct. 30, 2003

Related U.S. Application Data

(60) Provisional application No. 60/375,896, filed on Apr. 26, 2002.

(51) Int. Cl.
*F16B 37/14* (2006.01)

(52) U.S. Cl. .................... 411/372.6; 411/373; 411/431; 301/37.374

(58) Field of Classification Search ................ 411/429, 411/431, 910, 377, 372.5, 372.6, 373; 301/37.374
See application file for complete search history.

(56) References Cited

U.S. PATENT DOCUMENTS

| | | | |
|---|---|---|---|
| 2,432,531 A | 12/1947 | Lyon | |
| 2,588,372 A | 3/1952 | Erb | |
| 2,954,304 A | 9/1960 | Kroyer | |
| 3,138,407 A | 6/1964 | Duggan | |
| 3,364,806 A * | 1/1968 | Chaivre | 411/430 |
| 3,485,134 A * | 12/1969 | Ott | 411/372 |
| 3,561,820 A * | 2/1971 | Chaivre | 301/37.374 |
| 3,649,079 A | 3/1972 | Engllish | |
| 3,960,047 A | 6/1976 | Liffick | |
| 4,143,578 A | 3/1979 | Becker | |
| 4,201,110 A | 5/1980 | Hanai et al. | |
| 4,362,449 A | 12/1982 | Hlinsky | |
| 4,382,635 A | 5/1983 | Brown et al. | |
| 4,457,560 A | 7/1984 | Rowe et al. | |
| 4,460,300 A | 7/1984 | Bettini et al. | |
| 4,842,339 A | 6/1989 | Roulinson | |
| 4,969,788 A | 11/1990 | Goiny | |
| 4,971,498 A | 11/1990 | Goforth | |
| 4,986,712 A | 1/1991 | Fultz | |
| 5,028,093 A * | 7/1991 | Nason | 301/37.374 |
| 5,048,898 A * | 9/1991 | Russell | 301/37.375 |
| 5,082,409 A * | 1/1992 | Bias | 411/431 |
| 5,163,739 A | 11/1992 | Stanlake | |
| 5,193,884 A * | 3/1993 | Sheu et al. | 301/37.374 |
| 5,380,070 A * | 1/1995 | FitzGerald | 301/37.374 |
| 5,520,445 A | 5/1996 | Toth | |
| 5,590,992 A * | 1/1997 | Russell | 411/431 |

(Continued)

FOREIGN PATENT DOCUMENTS

EP 0 930 175 A1 7/1999
GB 2 051 285 A 1/1981

*Primary Examiner*—William L. Miller
(74) *Attorney, Agent, or Firm*—Dana Andrew Alden; Michael Pruden

(57) ABSTRACT

The present invention relates to a decorative cap for enclosing the head of a wheel bolt or wheel nut or the like which fastens a wheel to the hub of a vehicle, comprising an end closure wall, an endless side wall extending from an outer periphery of said end closure wall, a skid extending radially outwardly from a periphery of said side wall, and said skirt having a plurality of locking lips depending therefrom for releasably gripping the head.

19 Claims, 2 Drawing Sheets

U.S. PATENT DOCUMENTS

| | | |
|---|---|---|
| 5,772,377 A | 6/1998 | Bydalek |
| 5,810,532 A * | 9/1998 | Huang .................. 411/431 |
| 5,842,749 A * | 12/1998 | DiMarco ............... 301/37.375 |
| 6,102,488 A | 8/2000 | Wilson |
| 6,142,579 A * | 11/2000 | Thiel .................. 301/37.374 |
| 6,305,890 B1 * | 10/2001 | Okamura .................. 411/431 |

* cited by examiner

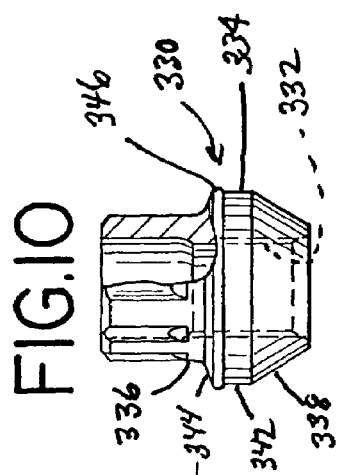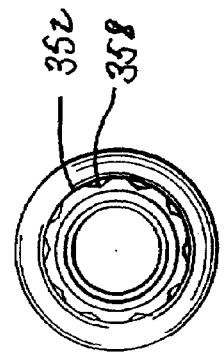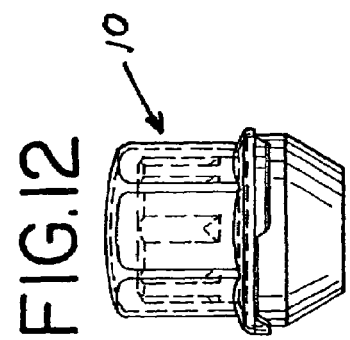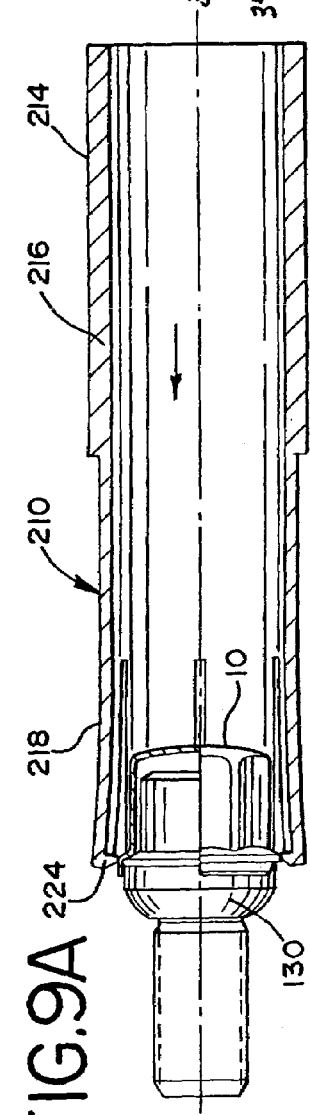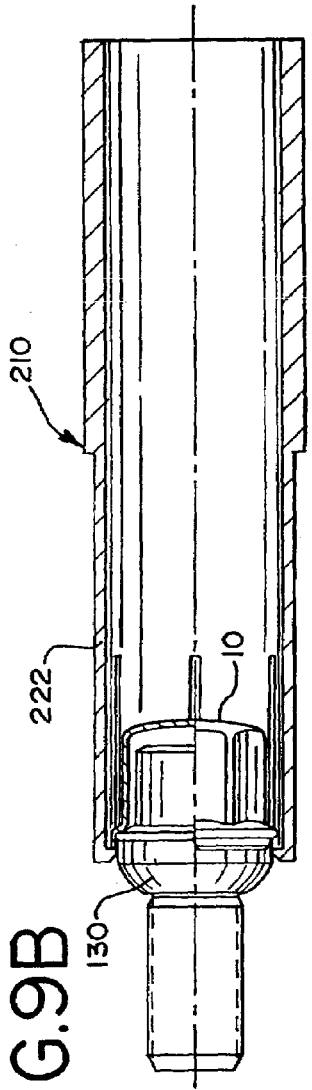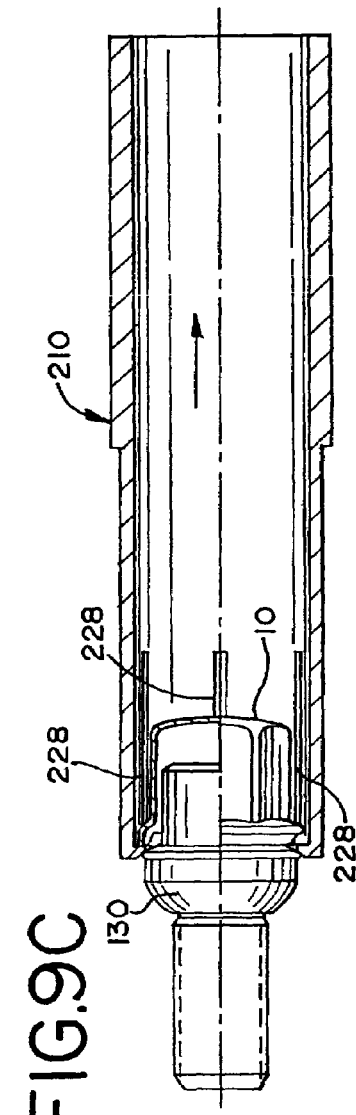

THEFT DETERRENT WHEEL FASTENER CAP ASSEMBLY AND METHOD

This application claims priority from U.S. provisional application Ser. No. 60/375,896, filed Apr. 26, 2002, entitled "THEFT DETERRENT WHEEL CAP ASSEMBLY AND METHOD."

RELATED APPLICATIONS

This invention relates generally to wheel bolts or nuts for fastening a wheel to a vehicle hub. It relates particularly to a decorative cap for a theft deterrent bolt head or nut.

BACKGROUND OF THE INVENTION

Theft deterrence for automobile or truck wheels, for example, is sometimes provided with a key type removal mechanism. One of the plurality of wheel bolts or nuts has a unique keying feature incorporated, and the bolt or nut can only be removed with a key carried by the vehicle operator.

Although anti-theft lock mechanisms such as these are effective against amateur thieves, professionals defeat them given a reasonable amount of time to do so. The present invention is designed to further thwart thieves seeking to remove vehicle wheels quickly.

There are numerous decorative caps for wheel nuts or bolts in the prior art. Some examples are seen in the Toth U.S. Pat. No. 4,775,272, the Lanham U.S. Pat. No. 4,968,202 and the Nolan et al. U.S. Pat. No. 5,180,266, for example. None provide the advantages hereinafter discussed in relation to the present invention.

BRIEF SUMMARY OF THE INVENTION

It is an object of the invention to provide an improved decorative wheel cap for a vehicle wheel bolt or wheel nut.

It is another object to provide a new and improved wheel bolt or wheel nut and decorative cap assembly which functions as a theft deterrent.

Still another object is to provide a method of concealing a keyed wheel bolt or wheel nut head with an improved decorative cap, as well as removing the cap when access to the bolt or nut is desired.

The foregoing and other objects are realized in a decorative cap for a wheel bolt or nut head, a decorative cap and wheel bolt or nut assembly, and a tool and method for removing the cap from a bolt or nut head. The cap, assembly, tool and method embodying features of the invention are illustrated and described below.

BRIEF DESCRIPTION OF SEVERAL VIEWS OF THE DRAWINGS

The invention, including the construction of wheel fastener caps, their assembly with wheel bolts and wheel nuts, and the method of use are illustrated more or less diagrammatically in the drawings, in which:

FIGS. 9A, 9B and 9C show the tool seen in FIGS. 7 and 8 being used in push-on, engagement and pull-off steps involved in the cap removal method of the invention;

FIG. 10 is a side elevational view (partially in section) of a wheel nut with an external key drive and which is adapted to receive the wheel cap seen in FIGS. 1–3;

FIG. 11 is a top plan view of the nut seen in FIG. 10; and

FIG. 12 is a side elevational view of an assembly comprising the cap of FIGS. 1–3 and the nut of FIGS. 10 and 11.

DETAILED DESCRIPTION OF THE INVENTION

Figure 1:
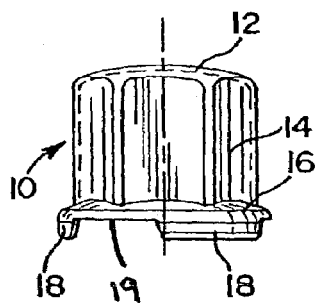
FIG. 1 is a side elevational view of a decorative wheel cap embodying features of the invention.
Figure 2:
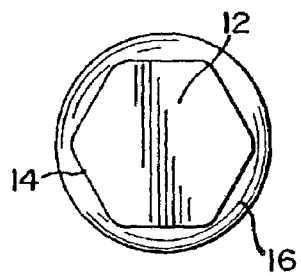
FIG. 2 is a top plan view of the wheel cap seen in FIG. 1.
Figure 3:
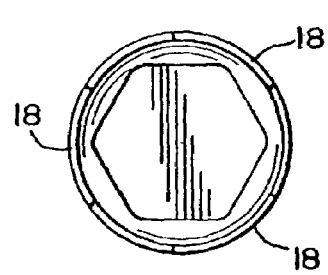
FIG. 3 is a bottom plan view of the wheel cap seen in FIGS. 1 and 2.

Referring now to the drawings, and particularly to FIGS. 1–3, a decorative cap for a vehicle wheel bolt or nut is seen generally at 10. The cap 10 is preferably formed in one piece from stainless steel sheet metal and includes a dome-shaped outer wall 12 and a generally cylindrical side wall 14 extending therefrom. A radially outwardly extending skirt 16 is formed around the inner end of the side wall 14.

The side wall 14 is polygonal in cross-sectional configuration so that it will appear to fit over the torque wrench gripping section of a wheel bolt head or wheel nut head in a manner hereinafter discussed. The skirt 16 has three identical locking lip segments 18 on its free inner edge 19, and extending slightly inwardly toward the center line CL of the cap 10. Each lip segment 18 extends around approximately 60° of the circumference of the skirt 16. The segments 18 are evenly spaced around the edge 19.

Figure 4:
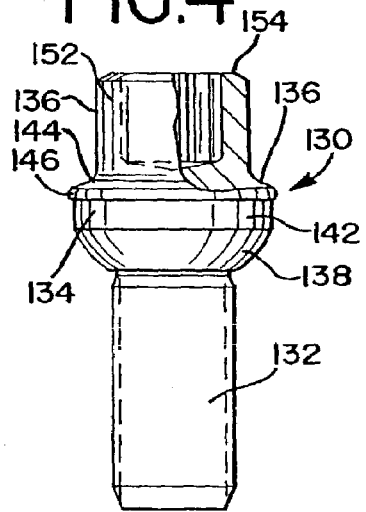
FIG. 4 is a side elevational view (partially in section) of a wheel bolt with an internal key drive and which is adapted to receive the wheel cap seen in FIGS. 1–3.
Figure 5:
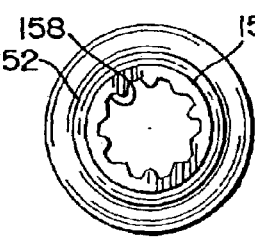
FIG. 5 is a top plan view of the bolt seen in FIG. 4.

Referring now to FIGS. 4 and 5, a wheel bolt to which the cap 10 is assembled in use is seen generally at 130. The wheel bolt 130 includes an externally threaded shaft section 132 at its inner end, an enlarged annular intermediate section 134 above the threaded shaft section and a head section 136 at its outer end.

The enlarged annular intermediate section 134 has a load bearing surface 138 which is segmentally spherical in shape, but might also be frusto-conical. Extending outwardly from the outer edge of the surface 138 in the intermediate section 134 is a cylindrical surface 142.

The intermediate section 134 is capped with an annular shoulder 144 which is somewhat frusto-conical in shape, albeit inverted relative to the load bearing surface 138. The outer periphery of the shoulder 144 overhangs the cylindrical surface 142 to form an annular, outwardly protruding bead 146.

The head section 136 has a cylindrical outer surface 152. Extending axially inwardly from the free end 154 of the head section 136 is an internal drive well 156. The well 156 has a series of axially extending key grooves 158 formed in its inner surface. The key grooves are designed to mate, in a conventional manner, with a complementary key (not shown) which is used with a conventional wrench to tighten or loosen the bolt 130.

Figure 6:
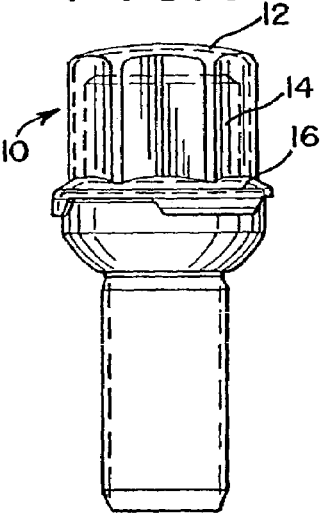
FIG. 6 is a side elevational view of an assembly comprising the cap of FIGS. 1–3 and the bolt of FIGS. 4 and 5.

Referring now to FIG. 6, the cap 10 is assembled with the bolt 130 in the manner illustrated. Assembly is normally by hand, with the cap 10 sliding loosely over the cylindrical surface 152 of the bolt head section 136 until the lip segments 18 are forced outwardly by the shoulder 144 of the intermediate bolt section and then snap inwardly under the bead 146.

With the cap 10 in place, the bolt 130 looks just like every other capped bolt (not shown) holding a wheel in place. The difference is that the other bolts are conventional polygon head bolts, and not internally keyed like the bolt 130. All of the bolts have identical caps, but only one is specially keyed in the manner of bolt 130. A thief is not only faced with one specially keyed bolt as a deterrent, but also the problem of locating that bolt (or even looking for it) in the little time normally available.

Figure 7:
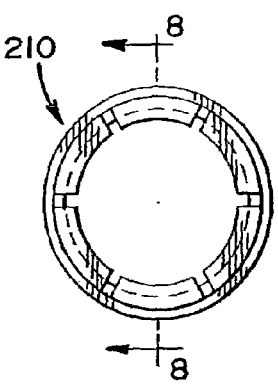
FIG. 7 is an end elevational view of a tool employed according to the invention for removing a wheel fastener cap embodying the invention from a wheel bolt or nut.
Figure 8:
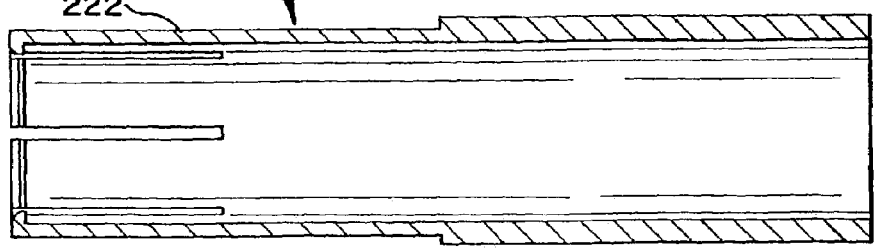
FIG. 8 is a sectional view taken along line 8—8 of FIG. 7.

Referring now to FIGS. 7–9, a cap removal tool embodying features of the invention is seen generally at 210. In FIGS. 7 and 8 the tool 210 is shown alone. In FIGS. 9A, 9B and 9C, it is shown being used in sequential steps to remove a cap 10 from a wheel bolt 130.

The tool 210 comprises an elongated cylindrical sleeve 212 fabricated of steel tubing or, in the alternative, a suitable plastic material. The sleeve 212 includes an outer hand grip section 214 in which the tubing wall is relatively thick, as at 216. The sleeve 212 also includes an inner cap gripping section 218 in which the tubing wall is thinner, as at 222.

The cap gripping section 218 of the tool 210 has an annular, inwardly extending ledge 224 formed on its free end. The cap gripping section 218 is also segmented along about one-half its length, inwardly of the ledge 224, by axially extending cut-outs 226. The resulting configuration of the section 218 is one of six axially extending fingers 228 which can flex inwardly and outwardly in a manner hereinafter discussed.

The tool 210 is used by pushing it onto an installed cap 10 in the manner shown in FIG. 9A. The ledge segments 224 are forced over locking lip segments 18 of the cap 10. The ledge segments 224 then spring inwardly, behind the free ends of the locking lip segments 18, to the position shown in FIG. 9B.

The operator then pulls the tool 210 away from the bolt 130, as seen in FIG. 9C. The ledge segments 224 on the tool 210 pull the lip segments 18 of the cap 10 back over the head 146 on the bolt 130, releasing the cap and permitting its removal by hand.

To this point, the inventions disclosed have been described in the context of a vehicle wheel bolt 130 which is internally keyed, as at 158. As was previously pointed out, however, the inventions are equally applicable to vehicle wheel nuts and, particularly, keyed wheel nuts.

FIGS. 10 and 11 illustrate a keyed wheel nut 330 embodying features of the invention. The wheel nut 330 is similar to the lug bolt 130 previously discussed with respect to its invention-related features.

The nut 330 includes an internally threaded bore 332, an enlarged annular intermediate body section 334 around the threaded bore and a head section 336 adjacent that. The annular intermediate section 334 has a generally frusto-conical load-bearing surface 338 (which might also be spherical). Extending upwardly from the outer edge of the surface 338 in the intermediate section 334 is a cylindrical surface 342.

The intermediate section 334 is capped with an annular shoulder 344 which is somewhat frusto-conical in shape, albeit inverted relative to the load-bearing surface 338. The outer periphery of the shoulder 344 overhangs the cylindrical surface 342 to form an annular, outwardly protruding bead 346.

The head section 336 has a generally cylindrical outer surface 352. The surface 352 has a series of axially extending key grooves 358 formed in it. The key grooves are designed to mate, in a conventional manner, with a complementary key (not shown) which is used with a torque wrench to tighten or loosen the bolt 330.

A cap 10 is mounted on the wheel nut 330 in the manner shown in FIG. 12. This is accomplished in a manner identical to that previously described in relation to the bolt 130. Correspondingly, the cap 10 removal process is identical.

What is claimed is:

1. A decorative cap and fastener for fastening a wheel to a hub of a vehicle comprising:
   a) a fastener head comprising:
      i) an outer end and an inner end;
      ii) a bead extending radially outward from the inner end;
   b) a cap comprising:
      i) an end wall;
      ii) a side wall extending from an outer periphery of the end wall;
      iii) a skirt extending radially outwardly from a periphery of the side wall; and
      iv) a plurality of lips extending from an edge of the skirt, wherein the lips underlie the bead, whereby the cap is rotatable with respect to the head.

2. A decorative cap and fastener for fastening a wheel to a hub of a vehicle according to claim 1, further comprising a load bearing surface located on the fastener head, wherein the load bearing surface is provided with a generally spherical shape.

3. A decorative cap and fastener for fastening a wheel to a hub of a vehicle according to claim 1, further comprising a load bearing surface located on the fastener head, wherein the load bearing surface is provided with a generally frusto-conical shape.

4. A decorative cap and fastener for fastening a wheel to a hub of a vehicle according to claim 1, wherein the bead is annular in shape.

5. A decorative cap and fastener for fastening a wheel to a hub of a vehicle according to claim 1, further comprising:
   a) a well located on the outer end of the fastener head; and
   b) wherein the side wall of the cap is provided with a polygonal shape.

6. A decorative cap and fastener for fastening a wheel to a hub of a vehicle according to claim 1, wherein the lips are snap fitted under the bead.

7. A decorative cap and fastener for fastening a wheel to a hub of a vehicle according to claim 1, wherein the cap is releasably secured to the fastener head.

8. A decorative cap and fastener for fastening a wheel to a hub of a vehicle comprising:
   a) a unitary fastener comprising:
      i) a head;
      ii) a bead that extends radially outward from at least a portion of the head;
      iii) a load bearing surface with a generally frusto-conical shape;
   b) a cap comprising:
      i) an end wall;
      ii) a side wall extending from an outer periphery of the end wall;
      iii) a skirt extending radially outwardly from a periphery of the side wall; and
      iv) a plurality of lips extending from an edge of the skirt, wherein the lips underlie the bead.

9. A decorative cap and fastener for fastening a wheel to a hub of a vehicle according to claim 8, wherein the bead is annular in shape.

10. A decorative cap and fastener for fastening a wheel to a hub of a vehicle according to claim 8, further comprising:
   a) a well located on the outer end of the fastener head; and
   b) wherein the side wall of the cap is provided with a polygonal shape.

11. A decorative cap and fastener for fastening a wheel to a hub of a vehicle according to claim 8, wherein the lips are snap fitted under the bead.

12. A decorative cap and fastener for fastening a wheel to a hub of a vehicle comprising:
   a) a fastener comprising:
      i) a head;
      ii) a bead that extends radially outward from at least a portion of the head;
   b) a cap comprising:
      an end wall;
      ii) a side wall extending from an outer periphery of the end wall;
      iii) a skirt extending radially outwardly from a periphery of the side wall; and
      iv) a plurality of lips extending from an edge of the skirt, wherein the lips are snap fitted under the bead.

13. A decorative cap and fastener for fastening a wheel to a hub of a vehicle according to claim 12, further comprising a load bearing surface located on the fastener, wherein the load bearing surface is provided with a generally spherical shape.

14. A decorative cap and fastener for fastening a wheel to a hub of a vehicle according to claim 12, further comprising a load bearing surface located on the fastener, wherein the load bearing surface is provided with a generally frusto-conical shape.

15. A decorative cap and fastener for fastening a wheel to a hub of a vehicle according to claim 12, wherein the bead is annular in shape.

16. A decorative cap and fastener for fastening a wheel to a hub of a vehicle according to claim 12, further comprising:
   a) a well located on the outer end of the fastener head; and
   b) wherein the side wall of the cap is provided with a polygonal shape.

17. A decorative cap and fastener for fastening a wheel to a hub of a vehicle according to claim 12, wherein the cap is releasably secured to the fastener head.

18. A decorative cap and fastener for fastening a wheel to a hub of a vehicle according to claim 12, wherein the cap is releasably secured to the fastener head and the cap is rotatable with respect to the fastener head.

19. A decorative cap and fastener for fastening a wheel to a hub of a vehicle comprising:
   a) a fastener head comprising a unitary structure that includes:
      i) an outer end and an inner end;
      ii) a bead extending radially outward from the inner end;
      iii) a load bearing surface that is generally frusto-conical in shape;
   b) a cap comprising:
      i) an end wall;
      ii) a side wall extending from an outer periphery of the end wall;
      iii) a skirt extending radially outwardly from a periphery of the side wall; and
      iv) a plurality of lips extending from an edge of the skirt, wherein the lips underlie the bead and releasably secure the cap to the fastener head.

* * * * *